US008078300B2

(12) United States Patent
Takagi et al.

(10) Patent No.: US 8,078,300 B2
(45) Date of Patent: Dec. 13, 2011

(54) INFORMATION PROCESSING DEVICE, SQUEALING SOUND GENERATION METHOD IN INFORMATION PROCESSING DEVICE, AND COMPUTER PROGRAM PRODUCT

(75) Inventors: Yasuhiro Takagi, Tokyo (JP); Kazuhiro Mori, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 1209 days.

(21) Appl. No.: 11/798,726

(22) Filed: May 16, 2007

(65) Prior Publication Data

US 2007/0269054 A1 Nov. 22, 2007

(30) Foreign Application Priority Data

May 17, 2006 (JP) .................................. 2006-137284

(51) Int. Cl.
*G06F 17/00* (2006.01)
(52) U.S. Cl. ......................................................... 700/94
(58) Field of Classification Search ...................... 700/94
See application file for complete search history.

(56) References Cited

U.S. PATENT DOCUMENTS

2001/0023202 A1 9/2001 Okubo

FOREIGN PATENT DOCUMENTS

| EP | 1 609 447 | 12/2005 |
| JP | 10-137445 | 5/1998 |
| JP | 2000-56668 | 2/2000 |
| JP | 2000-153057 | 6/2000 |
| JP | 2000-279636 | 10/2000 |

OTHER PUBLICATIONS

Chris Linder, KarmaCars, http://udn.epicgames.com/Two/KarmaCars#Karma_Cars (archived by WayBackMachine on Dec. 5, 2004).*
Chris Linder, Hotrod and Trailer Tutorial, http://udn.epicgames.com/Two/HotRod#Hotrod_and_Trailer_Tutorial (archived by WayBackMachine on Dec. 5, 2004).*
MathWorks, SimDriveline—Tire, http://www.mathworks.com/access/helpdesk/help/toolbox/physmod/drive/tire.htm (archived by WayBackMachine on Nov. 16, 2004).*
Extended European Search Report for EP Application No. 07252028.1, mailed Aug. 31, 2011.

* cited by examiner

*Primary Examiner* — Walter F Briney, III
(74) *Attorney, Agent, or Firm* — Finnegan, Henderson, Farabow, Garrett & Dunner, L.L.P.

(57) ABSTRACT

A computer program product for causing a computer of an information processing device to execute processing for generating a sound that is generated by a mobile object with a plurality of tires, which moves on a predetermined surface within a virtual three-dimensional space, the computer being caused to execute the steps of: controlling the movement of the mobile object; calculating a load applied to at least one of the tires of the mobile object; controlling, on the basis of the load, a volume and a pitch of a squealing sound generated from the tires; and outputting the squealing sound. The computer is further caused to execute the steps of calculating a slip angle of at least one of the tires of the mobile object, and changing the tone of the squealing sound on the basis of the slip angle.

13 Claims, 8 Drawing Sheets

INFORMATION PROCESSING DEVICE, SQUEALING SOUND GENERATION METHOD IN INFORMATION PROCESSING DEVICE, AND COMPUTER PROGRAM PRODUCT

BACKGROUND OF THE INVENTION

1. Field of the Invention

The present invention relates to an information processing device, a squealing sound generation method in the information-processing device, and a computer program product. More particularly, the present invention relates to an improvement of an artificial sound generation technology in a simulation game device on which one can play a game, such as a car race or Time Attack, as a driver of a vehicle within a virtual three-dimensional space.

2. Description of Related Art

There has been provided a simulation game device on which a player can play a car race, Time Attack, or other driving game as a driver of a virtual vehicle within a virtual three-dimensional space. Such a game device has games where a player can have a realistic excitement by skidding and crashing the virtual vehicle in accordance with the driving situations. Also, the sound effects of various artificial sounds produced according to the driving situations can bring further realistic excitement (see, for example, Patent Document 1).

The sound includes the engine sound, and shrill frictional noise that is generated when a tire violently skid when the vehicle accelerates suddenly, brakes suddenly, and makes a sharp turn (so-called "squealing sound", such as screeching and squeaking noises, that can be expressed in onomatopoeia). Conventionally, the squealing sounds in driving games were generated with a loop tone or single tone, while changing the pitches of the pre-registered tones as necessary, in accordance with the degree of frictional force between the tires of a virtual vehicle and the road surface.

[Patent Document 1] Japanese Patent Laid-open Publication No. H10-137445

SUMMARY OF THE INVENTION

However, from the following standpoint, the conventional squealing sounds produced in the driving game devices are not sufficient. Specifically, actual squealing sounds include a type of sound that is generated when a vehicle drifts and the tires rotate, and a type of sound that is generated when the brake is fully applied and locked. Furthermore, the groups of tones of these sounds have different sound quality, and various changes in the tones play a significant role when a driver tries to figure out the behavior of an actual vehicle. Similarly, in a simulation game such as a race-type game as well, the squealing sounds play an extremely significant role when collecting information on the vehicle body behavior or running condition of the virtual vehicle, as well as when creating powerful sound effects and the like. However, the conventional technology does not create sufficient changes in the tones and does not have rationality as the sound information for understanding the behavior.

It is therefore an object of the present invention to provide an information processing device, a squealing sound generation method of the information processing device, and a computer program product, which enable a game to proceed smoothly by allowing a player to have a better understanding about behavior and running conditions of a virtual vehicle, and are capable of creating more powerful sound effects by providing a variety of tones.

In order to solve the above problems, the inventor has conducted various investigations on squealing sounds having a variety of changes in tones and improved rationality as sound information. For example, there are a number of different changes in squealing sounds in an actual vehicle. With regard to this matter, the larger the difference between the traveling direction of the vehicle and the direction of the tires (referred to as "slip angle" hereinafter), the more aggressive tone is produced, and the larger the vertical load (also simply referred to as "load" hereinafter) applied to the contact area of each tire, the lower the pitch. According to a further investigation, a number of reasons for a change of tones can be considered, such as traveling speed of the vehicle, road surface, and the material and condition of each tire. However, the inventor has found that the most important item of these conditions is the slip angle and the load.

The present invention is based on such finding, and is a computer program product, comprising: a computer usable medium having a computer readable program code embodied therein, wherein the program product is a program for causing a computer of an information processing device to execute processing for generating a sound that is generated by a mobile object with a plurality of tires, which moves on a predetermined surface within a virtual three-dimensional space, the computer program comprising: a computer readable code configured to cause the computer to control movement of the mobile object; a computer readable code configured to cause the computer to calculate a load applied to at least one of the tires of the mobile object; a computer readable code configured to cause the computer to control, on the basis of the load, a volume and a pitch of a squealing sound generated from at least one of the tires; and a computer readable code configured to cause the computer to output the squealing sound.

In the case of an actual vehicle, the volume of a squealing sound increases and the pitch of the squealing sound decreases as the load applied to the tires increases. In the present invention, on the other hand, the two elements, the pitch and the volume, are controlled simultaneously on the basis of load information, whereby a squealing sound that is similar to the actual sound of the actual vehicle can be generated. Moreover, the parameter for generating sound is the load applied to at least one of the tires of the virtual vehicle, and the information on this load can be obtained from the computation performed by the computer, thus the generation computation can be simplified.

In addition, the tone of the squealing sound in the actual vehicle tends to be loud as the load increases, thus it is preferred to focus on three elements of the tone, volume and pitch, based on this tendency. In this case, computation of the load can be simplified by controlling the three elements on the basis of the value of the load only. However, the present invention further causes the computer to execute the steps of calculating the slip angle of at least one of the tires of the mobile object, and changing the tone of the squealing sound on the basis of the slip angle. In this case, the slip angle can be added as another parameter, and data on the tone based on this parameter can be reflected in the squealing sound, whereby the squealing sound that is similar to the actual sound can be generated.

Furthermore, the computer program product of the present invention further causes the computer to execute a step of determining whether to generate the squealing sound, only when the load is within a predetermined range. By causing the computer to execute this step, when the load is not within the predetermined range the squealing sound cannot be generated. Therefore, by setting a range required for generating a squealing sound in advance or omitting other operation, calculation of the load can be further simplified.

Moreover, it is preferred that the computer be further caused to execute a step of switching between the processing for generating the squealing sound and avoidance of the processing for generating the squealing sound, in response to a change in a viewpoint of an image in the information processing device, or a change in the distance between a mobile object, which is the basis of the viewpoint, and the mobile object, which is a target for generating the squealing sound. In the case in which the viewpoint of the image in the information processing device is switched to a viewpoint in which the image is seen from a distance, or in the case in which the target mobile object moves far away from a virtual current position of the player, it means it is determined that the squealing sound no longer needs to be generated. Therefore, in such a case, the processing for generating a squealing sound can be avoided and omitted, whereby calculation of the load can be simplified.

Alternatively, in place of the switching step described above, the following switching step is preferably executed. Specifically, in response to a change in a viewpoint of the image in the information processing device, or a change in the distance between a mobile object, which is the basis of the viewpoint, and the mobile object, which is the target for generating a squealing sound, a step of switching to first generation processing for generating the squealing sound on the basis of the load and the slip angle, second generation processing for generating the squealing sound on the basis of the load only, or avoidance of the squealing sound generation processing is further executed. In the case in which the viewpoint of the image in the information processing device (game device, for example) is switched to a viewpoint in which the image is seen from a distance, or in the case in which the target mobile object moves far away from the virtual current position of the player, the generation processing contents are switched on the basis of the virtual distance between a mobile object that is the basis of the viewpoint and the squealing sound generation target. Accordingly, appropriate processing can be executed according to the circumstances, such that the generation processing can be avoided when a squealing sound does not need to be generated, the squealing sound is generated simply when the squealing sound is not important, and the usual processing is performed and information on the load or slip angle is added when the squealing sound is important.

In the present invention, the computer is caused to realize a function of generating independent squealing sound for each of the plurality of tires. Although there is a case in which substantially the same load is applied to the tires, generally different load is applied to each tire under circumstances that change successively. Therefore, instead of generating/outputting a squealing sound of, for example, four tires integrally, it is preferred that, in view of such circumstances, the squealing sound of one tire be individually controlled, generated, and outputted. In this case, the player can be provided with further detailed information on the vehicle body behavior.

Moreover, the computer program product according to the present invention causes the computer to further execute the steps of: calculating the engine speed of the mobile object; generating an engine sound on the basis of the engine speed; and lowering the volume of the engine sound when the squealing sound is generated. By causing the computer to execute the steps of calculating the engine speed and generating the engine sound, an artificial engine sound corresponding to the virtual engine speed of the virtual vehicle can be outputted. As described above, the squealing sound is an extremely important information source in order to understand the behavior of the vehicle body, thus, when outputting the squealing sound in the information processing device, the volume of the engine sound of the mobile object (the basis of the viewpoint, such as a virtual vehicle operated by the player) is lowered temporarily, so that a squealing sound that the player can hear more comfortably can be generated.

The information processing device according to the present invention is a game device that causes a computer to execute processing for generating a sound that is generated by a mobile object with a plurality of tires, which moves on a predetermined surface within a virtual three-dimensional space, and to output the generated sound, wherein the game device has: a computer that calculates a load applied to at least one of the tires of the mobile object subjected to movement control, and controls, on the basis of the calculated load, a volume and a pitch of a squealing sound generated from at least one of the tires; and an output device that outputs the squealing sound.

The squealing sound generation method according to the present invention is for performing processing for generating a sound that is generated by a mobile object with a plurality of tires, which moves on a predetermined surface within a virtual three-dimensional space in an information processing device, the method having the steps of: controlling movement of the mobile object; calculating a load that is applied to at least one of the tires of the mobile object at the time when the movement of the mobile object is controlled; controlling, on the basis of the calculated load, a volume and a pitch of a squealing sound generated from at least one of the tires; and outputting the squealing sound.

According to the present invention, the player can have a grasp on the behavior and driving situations of the virtual vehicle so that the smooth progress of the game can be realized, and a variety of tones can be provided so that more powerful sound effects can be achieved.

DETAILED DESCRIPTION OF PREFERRED EMBODIMENT

Hereinafter, configurations of the present invention are described with reference to an example of embodiments shown in the figures.

FIG. 1 through FIG. 8 show embodiments of the information processing device and of the squealing sound generation program and method for this device according to the present invention. A game device 1 of the present embodiment is one of the information processing devices for simulation gaming on which a player can pretend to be a driver of a virtual mobile object (virtual vehicle) 4 within a virtual three-dimensional space and enjoy a car race, Time Attack, or other driving game. This game device 1 is configured so as to cause a computer C to execute processing for generating a sound that is generated by the mobile object with a plurality of tires 5, which moves on a predetermined surface within the virtual three-dimensional space (see FIG. 1). The predetermine surface includes a flat surface and a curved surface. The game device 1 of the present embodiment has: the computer C that calculates a load applied to each of the tires 5 of the mobile object subjected to movement control, and controls, on the basis of the calculated load, a volume and a pitch of a squealing sound generated from each tire 5; and an output device that outputs the squealing sound, wherein the squealing sound in each driving situation is recorded or generated, the volume and tone are determined based on the sequentially changing control information such as, at least, the load applied to each tire 5 and, depending on circumstances, the slip angle θ, and corresponding squealing sounds are outputted successively to create powerful sound effects.

Hereinafter, an overview of the game device 1 of the present embodiment is described first, and then configurations involved in generating and outputting the squealing sounds are described.

Figure 2:
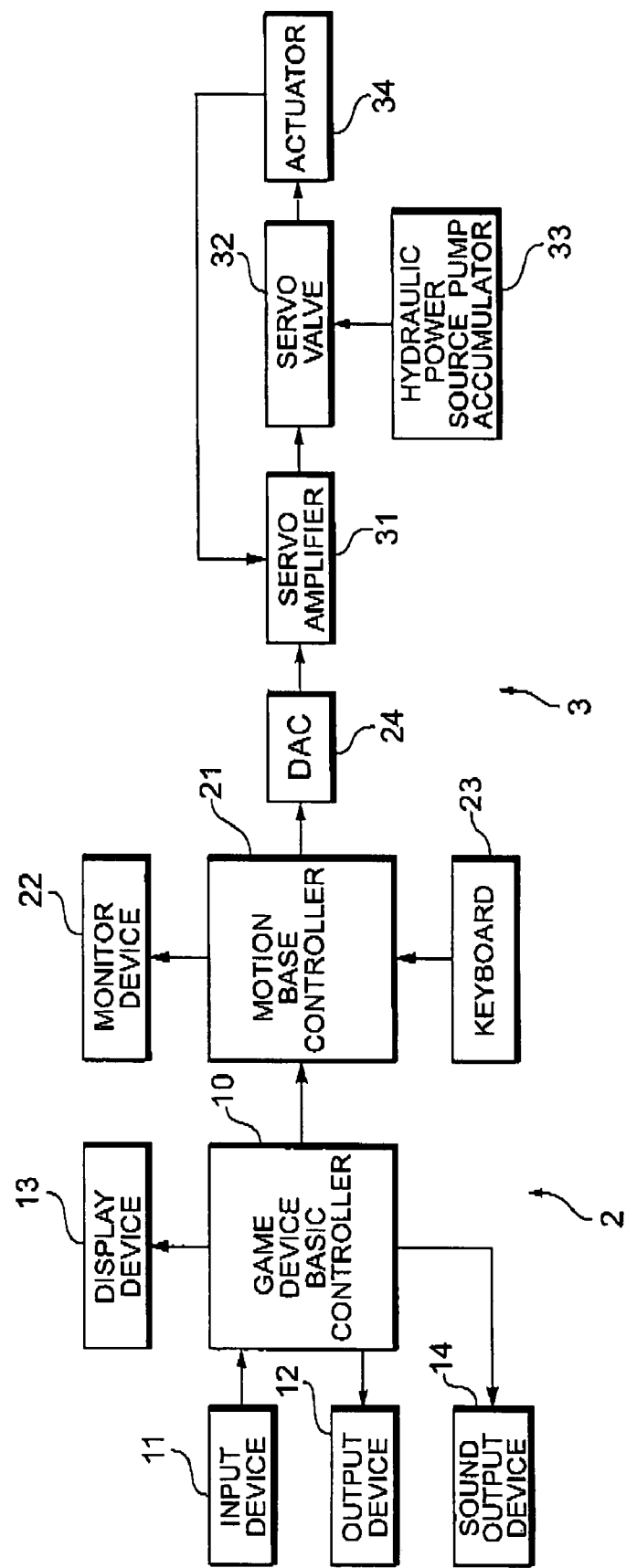
FIG. 2 is a block diagram showing a control system of the game device.
Figure 3:
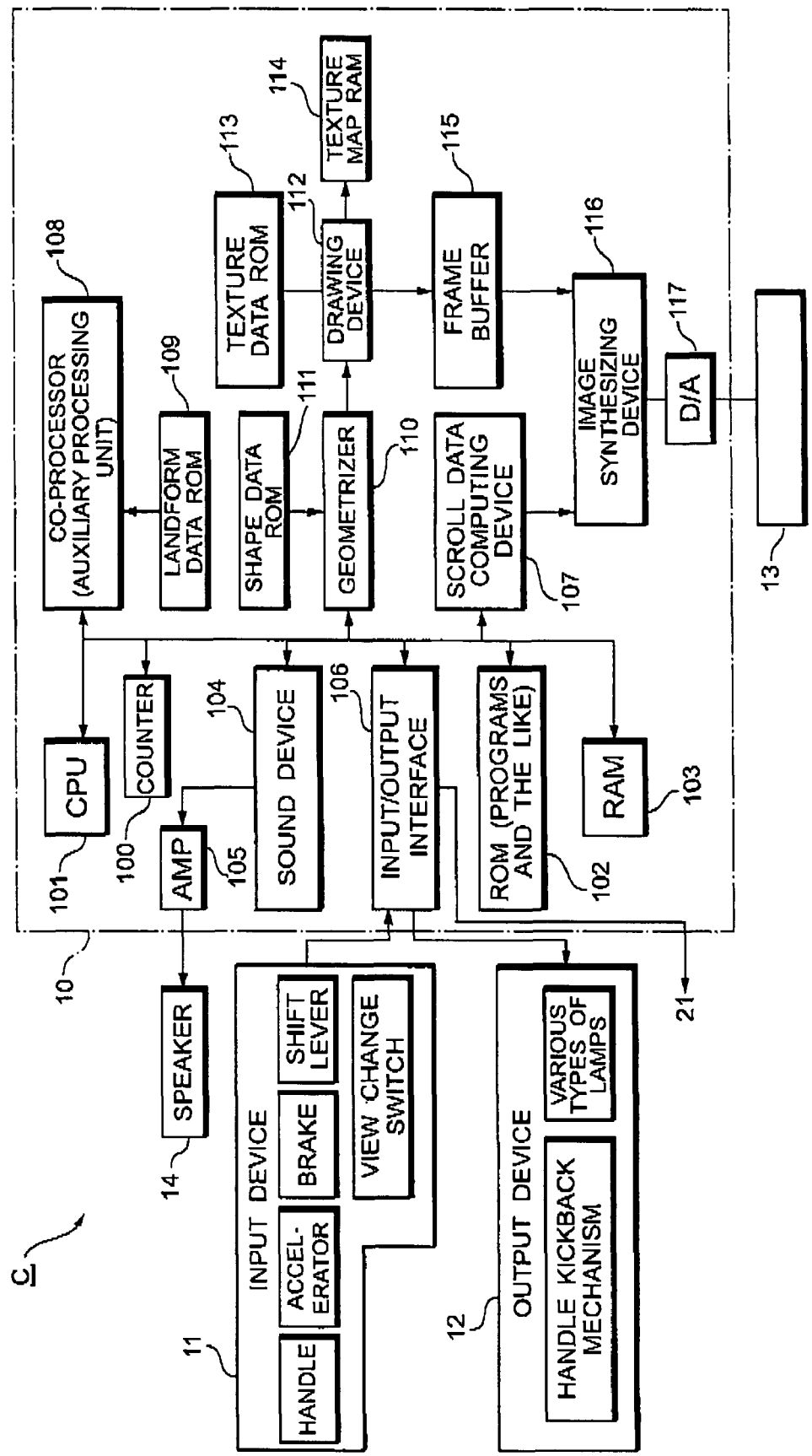
FIG. 3 is a block diagram showing a configuration example of a basic controller of the game device.

FIG. 2 is a block diagram showing a control system of the game device 1 for driving games, according to the present embodiment. Also, FIG. 3 is a block diagram illustrating the computer C according to the present embodiment. The control system of this game device 1 is classified into a basic control system 2 and a motion control system 3. The basic control system 2 is responsible for the control of basic elements of the game device 1, and has a game device basic controller 10, an input device 11, an output device 12, a display device 13 such as a projector, TV monitor or the like, and a sound output device 14 such as a speaker.

The motion control system 3 is used when vertically or horizontally moving (motion-controlling) an artificial vehicle body or the like that the player sits on or gets into, so that the artificial vehicle body is operated simultaneously with an operation (steering) state, and when changing the position or movement of the artificial vehicle body. Although not described specifically in the present embodiment, the motion control system 3 is constituted by, for example, a motion base controller 21 for controlling a six-axes cylinder of a motion base on which the artificial vehicle body is installed, a monitor device 22 that displays control situations, a keyboard 23, which is an input device used by an operator to give an instruction to the motion base controller 21, a DAC (digital/analog converter) 24 that converts a drive data output of the motion base controller 21 to an analog signal, a servo valve 32 that magnifies the power of an output from the DAC 24 and adjusts oil supply from a hydraulic power source pump accumulator 33, a servo amplifier 31 that drives the servo valve 32, an actuator 34 that sets a stroke of an arm one end of which is connected to the artificial vehicle body by means of oil supplied from the servo valve 32, and the like (see FIG. 2). In addition to forces in three directions of, for example, an X axis, a Y axis, and Z axis, forces in directions of rotations of the respective axes (pitch, yaw and roll) are applied to the artificial vehicle body, whereby six axial control is performed, and the position or movement of the artificial vehicle body is changed.

Figure 1:
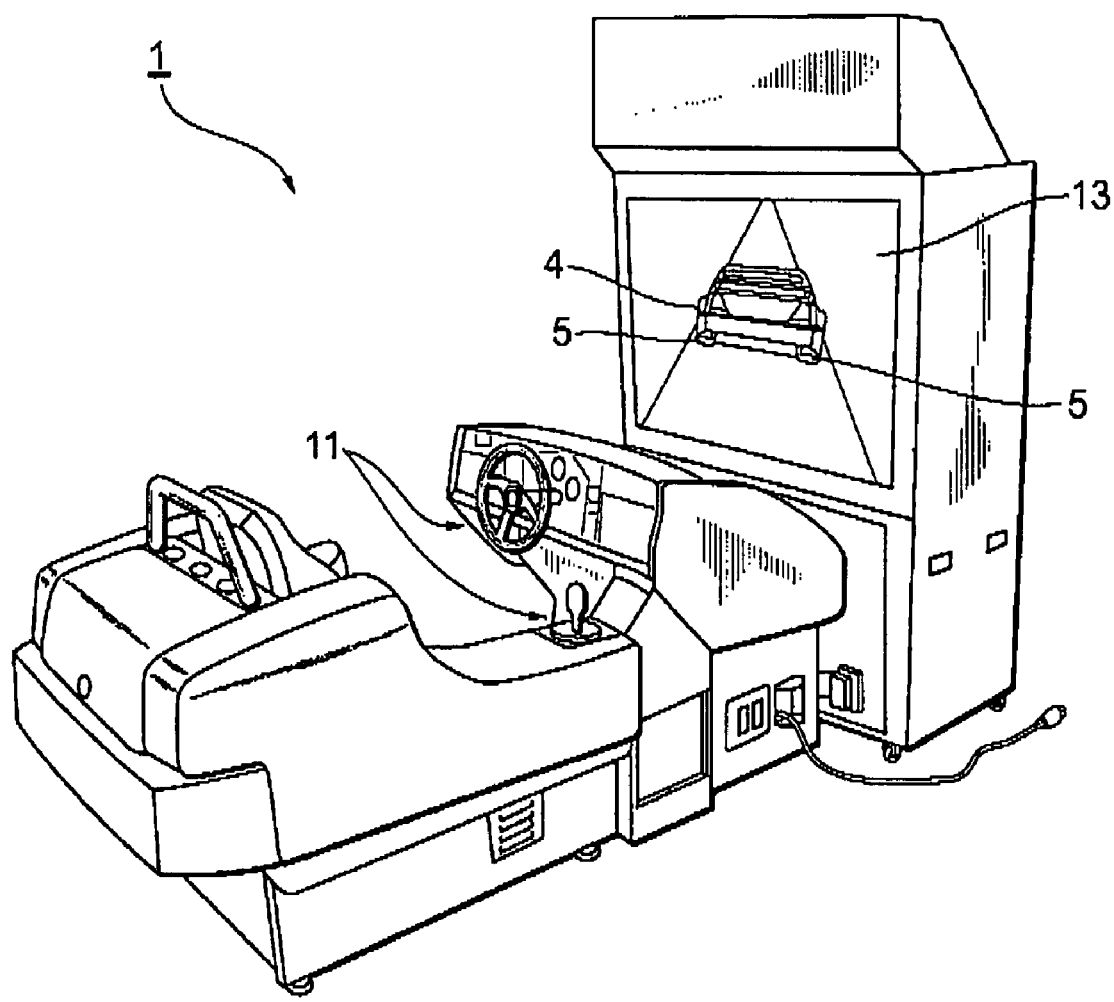
FIG. 1 is an entire diagram showing an example of a game device for playing a driving game according to the present embodiment.

The input device 11 is provided in the main body of the game device 1 and is constituted by a handle, an accelerator, a brake, a shift lever, a view change (viewpoint change) switch, and the like (see FIG. 1, FIG. 3). The output device 12 has a handle kickback mechanism, various kinds of lamps and the like (see FIG. 3). The display device 13 displays an image of a driving game, and, when being provided with the artificial vehicle body described above, is attached to the artificial vehicle body side so as to correspond to the movement thereof. The view change switch is a switch for changing a viewpoint. Operation of this switch sequentially switches between a view (scene) from a driver's seat of a virtual vehicle 4 and a view showing the vehicle (virtual vehicle 4) as seen from the right or left side of the back of the vehicle.

The game device basic controller 10 has a CPU (central processing unit) 101, and is also provided with ROM 102, RAM 103, sound device 104, input/output interface 106, scroll data computing device 107, co-processor (auxiliary processing unit) 108, landform data ROM 109, geometrizer 110, shape data ROM 111, drawing device 112, texture data ROM 113, texture map RAM 114, frame buffer 115, image synchronizing device 116, and D/A converter 117 (see FIG. 3).

The CPU 101 is connected via bus lines to the ROM 102 storing a predetermined program and the like, the RAM 103 storing data, the sound device 104, the input/output interface 106, the scroll data computing device 107, the co-processor 108, and the geometrizer 110. The RAM 103 functions as a RAM for the buffer, so various commands (such as a command to display objects) to the geometrizer 110 are written on the RAM and a matrix at the time of conversion matrix computation is written on the RAM (as in scaling of a cloud of dust as described hereinafter).

The input/output interface 106 is connected to the input device 11 and the output device 12, whereby operation signals of a handle and the like of the input device 11 are loaded into the CPU 101 as digital quantity, and signals generated by the CPU 101 and the like are outputted to the output device 12. These signals include various kinds of flag signals. In the case in which the abovementioned artificial vehicle body is provided in the game device 1, such signals are also outputted to the motion base controller 21 (see FIG. 3).

The sound device 104 is connected to the speaker 14 via a power amplifier 105, and sound signals generated by the sound device 104 are amplified and then transmitted to the speaker 14 used as the sound output device.

Here, the CPU 101 according to the present embodiment reads in, on the basis of the program installed in the ROM 102, operation signals from the input device 11 and landform data from the landform data ROM 109 or shape data (three-dimensional data of "objects such as the player's vehicle and opponent vehicles" and "background such as roads, landform, sky, audience and structures") from the shape data ROM 111, and then performs at least vehicle behavior computation (simulation), such as determination of contact (collision) between the landform and the virtual vehicle 4, behavior computation on a four-wheel (wheel) suspension, and a determination of collision between the virtual vehicles 4, as well as orbital computation on a cloud of dust and the like used as the special effects.

It should be noted that the vehicle behavior computation is performed to simulate the movements of the vehicle in a virtual space by means of the operation signals sent by the player from the input device 11. After a coordinate value within a three-dimensional space is determined, a conversion matrix for converting the coordinate value into a visual field coordinate system, and the shape data (vehicles and landform and the like) are specified at the geometrizer 110. The landform data ROM 109 is connected to the co-processor 108, and, therefore, predetermined landform data is transmitted to the co-processor 108 (and the CPU 101). The co-processor 108 is designed mainly to perform determination of contact between the landform and the vehicle and to assume mainly computation of floating decimal points during this determination and the car behavior computation. As a result, the co-processor 108 executes the determination of contact (collision) between the vehicle and the landform, and the results of determination are provided to the CPU 101, whereby the computation load on the CPU 101 can be reduced and this contact determination can be performed more promptly.

The geometrizer 110 is connected to the shape data ROM 111 and the drawing device 112. The shape data ROM 111 has previously stored therein polygon shape data (three-dimensional data consisting of respective vertexes, such as vehicles, landform, and background), and this shape data is transmitted to the geometrizer 110. The geometrizer 110 perspectively converts the shape data designated by a conversion matrix sent from the CPU 101, and obtains data converted from a coordinate system within a three-dimensional virtual space to a visual field coordinate system.

The drawing device 112 pastes textures onto the converted shape data of the visual field coordinate system, and outputs such data to the frame buffer 115. In order to paste the textures, the drawing device 112 is connected to the texture data ROM 113 and the texture map RAM 114, and further to the frame buffer 115. It should be noted that polygon data means a group of data on relative or absolute coordinates of respective vertexes of a polygon (polygon: mainly a triangle or quadrangle), which is made of a group of a plurality of vertexes. The landform data ROM 109 stores polygon data that is set comparatively rough so that the determination of contact between the vehicle and the landform can be executed. On the other hand, the shape data ROM 111 stores polygon data that is set in more details with regard to shapes, such as vehicles and background, which configure a screen.

The scroll data computing device 107 computes scroll screen data such as letters. This computing device 107 and the frame buffer 115 are connected via the image synthesizing device 116 and the D/A converter 117 to the display device 13. Accordingly, a polygon screen (simulation results) such as the vehicle and landform (background) stored temporarily in the frame buffer 115, and a scroll screen with letter information such as a speed value and lap time are synthesized in accordance with a designated priority, whereby a final frame image data is generated. This image data is converted by the D/A converter 117 into an analog signal and transmitted to the display device 13, and the image of the driving game is displayed in real time.

Next, configurations involved in generating and outputting squealing sounds in the game device 1 of the present embodiment are described (see FIG. 4 through FIG. 8).

Figure 4:
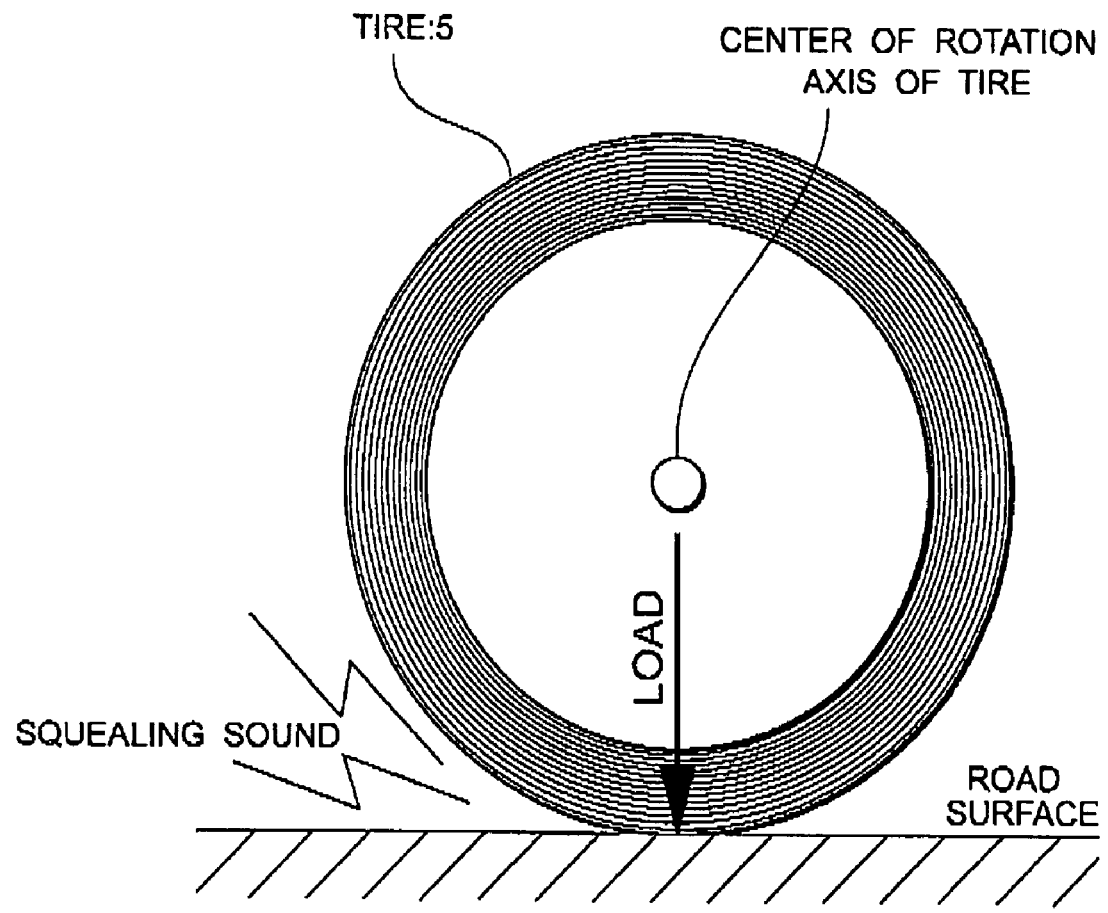
FIG. 4 is a side view of a tire, which is used for explaining the relationship between a load and a squealing sound.
Figure 5:
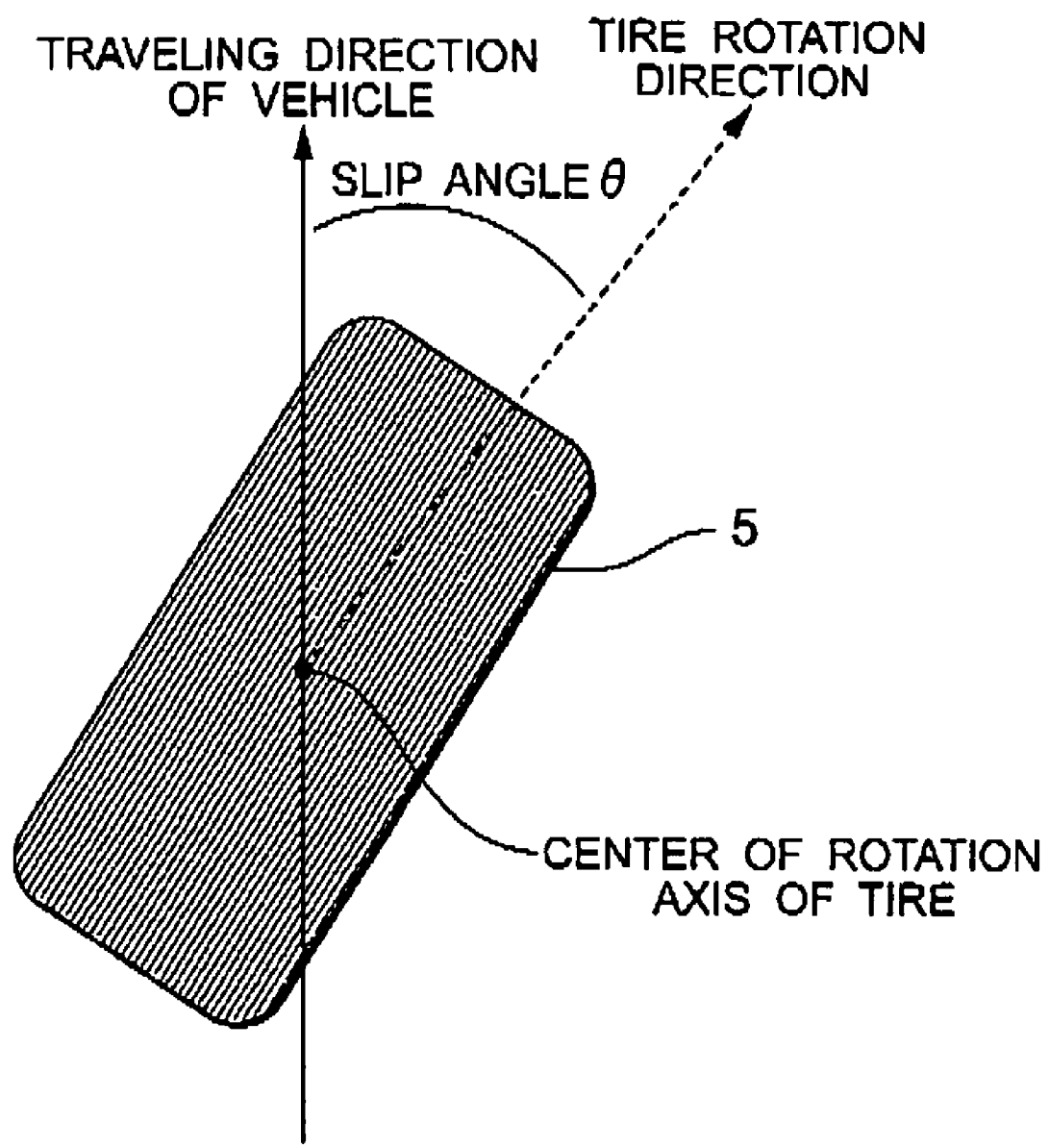
FIG. 5 is a plan view of the tire, which is used for explaining the relationship between a slip angle θ and the squealing sound.

Here, the relationship between a load and a squealing sound, and the relationship between a slip angle θ and a squealing sound are described (see FIG. 4, FIG. 5). First, with regard to the relationship between a load and a squealing sound, a plurality of reference values are set on the basis of a load applied to each of the tires 5 during a stationary state of the vehicle, and the load on each tire is compared with each reference value. The relationship between a load and a squealing sound is shown by classifying the degree of the load into a total of four stages: two stages of "large" and "excessively large" in the case in which a large load acts; and two stages of "small" and "excessively small" in the case in which a small load acts (see Table 1). More specifically, the volume (loudness of a sound) and pitch (pitch of a sound that changes according to frequencies) of a squealing sound change in accordance with the size of the load. It should be noted that the load that acts when a squealing sound is generated is usually larger or smaller than the one that acts during the stationary state of the vehicle, thus the reference values are preferably set such that "large" or "small" is set.

TABLE 1

(TABLE 1)

| LOAD | EXCESSIVELY SMALL | SMALL | LARGE | EXCESSIVELY LARGE |
|---|---|---|---|---|
| VOLUME | EXCESSIVELY SMALL VOLUME | SMALL VOLUME | LARGE VOLUME | EXCESSIVELY LARGE VOLUME |
| PITCH | NOISE | HIGH RANGE | MIDRANGE | LOW RANGE |

First, when the load is large, the volume of a squealing sound is high and the pitch of the squealing sound is midrange. When the load is excessively large, the volume of the squealing sound is excessively high and the pitch of the squealing sound is low. Furthermore, when the load is small, the volume of the squealing sound is low and the pitch of the squealing sound is high. When the load is excessively snail, the volume of the squealing sound is excessively small and the pitch of the squealing sound is complicated, i.e., a pitch where broadband sounds are mixed is obtained.

The relationship between a slip angle θ and a squealing sound is shown next. As described above, a slip angle θ is an angle between a traveling direction of the vehicle and the direction of the tires 5 (tire rotation direction) (see FIG. 5), and the size of this angle influences the tone of a squealing sound, i.e., the characteristics of the sound. This means that the change in the slip angle θ changes the characteristics of the sound even if the same load acts. In this embodiment, a slip angle θ is classified into three levels of "small", "medium", and "large" to show the relationship between the slip angle θ and a squealing sound (see Table 2).

TABLE 2

(TABLE 2)

| SLIP ANGLE | SMALL | MEDIUM | LARGE |
|---|---|---|---|
| TONES | A QUIET TONE WITH A SENSE OF PITCH | LOUD TONE WITH A SENSE OF PITCH | AN AGGRESSIVE TONE WITH A SENSE OF PITCH |
| EXAMPLES OF TONES | A TYPE OF SOUND THAT IS GENERATED FROM THE TIRES AT A GENTLE CURVE AND THAT DOES NOT CAUSE DANGER TO A DRIVER. | A TYPE OF SOUND THAT IS GENERATED FROM THE TIRES AT A SOMEWHAT TIGHT CURVE AND THAT CAUSES A SLIGHT DANGER TO THE DRIVER. | A TYPE OF SOUND THAT IS GENERATED WHEN THE BRAKES ARE SLAMMED ON DURING HIGH-SPEED TRAVELING OR WHEN THE ANGLE OF ROTATION OF THE TIRES WITH RESPECT TO THE TRAVELING DIRECTION OF THE VEHICLE IS LARGE AND THAT CAUSES AN EXTREME DANGER TO THE DRIVER. |

Figure 6:
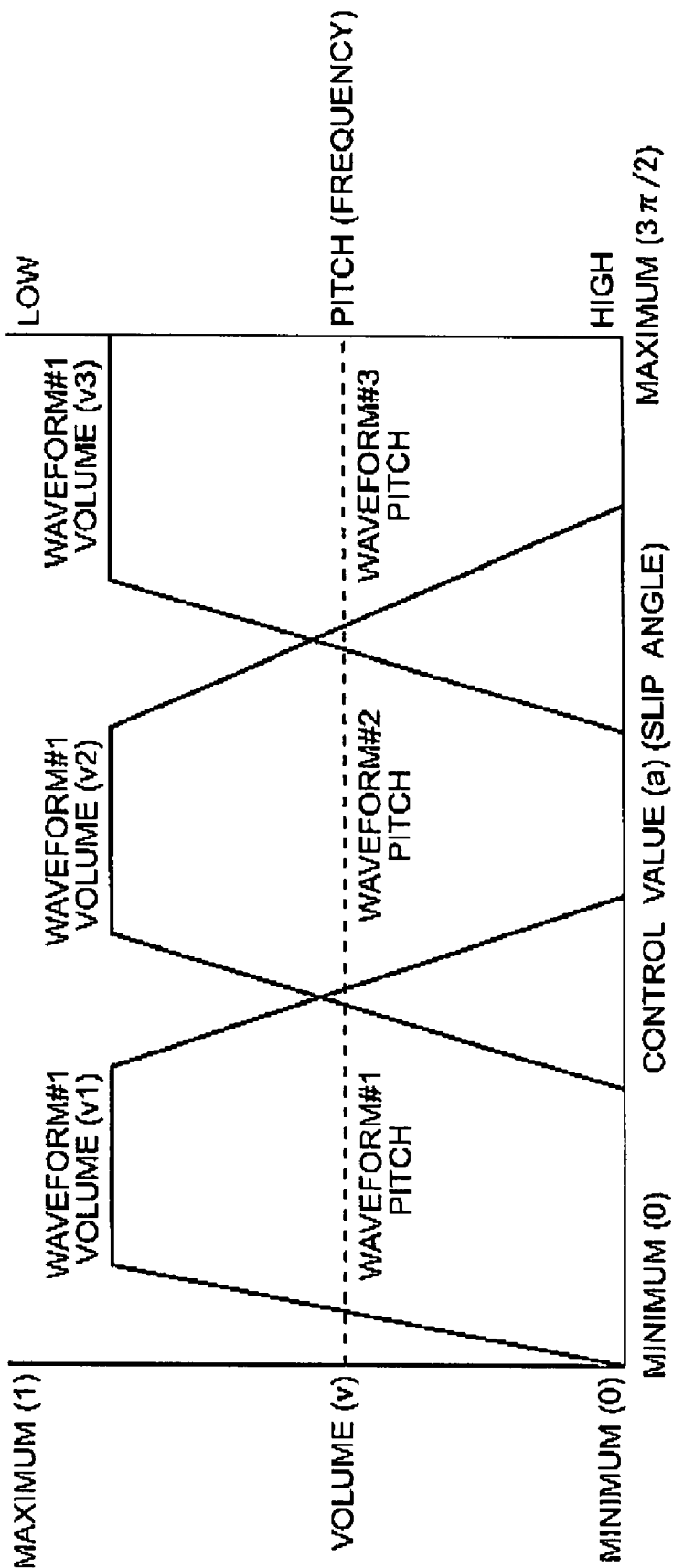
FIG. 6 is a diagram showing an example of sound waveform data in which three waveforms are cross-faded (data table)

First, when a slip angle θ is small, the tone of a squealing sound is a quiet xtone with a sense of pitch, e.g., a type of slight sound that is generated from the tire 5 at a gentle curve and that does not cause danger to a driver (see the waveform #1 shown in FIG. 6). Also, when the slip angle θ is a medium, the tone of the squealing sound is a loud tone with a sense of pitch, e.g., a type of sound that is generated from the tires 5 at a somewhat tight curve and that causes danger to the driver (see the waveform #2 shown in FIG. 6). Furthermore, when the slip angle θ is large, the tone of the squealing sound is an aggressive tone with a sense of pitch, e.g., a type of sound that is generated when the brakes are slammed on during high-speed traveling or when the angle of rotation of the tires 5 with respect to the traveling direction of the vehicle is large and that causes extreme danger to the driver (see the waveform #3 shown in FIG. 6).

Here, an example of sound waveform data based on the relationship between a load and a squealing sound and the relationship between a slip angle θ and a squealing sound is shown. In the present embodiment, on the basis of the three waveforms of the waveform #1 through the waveform #3 that are obtained on the basis of the relationship between the slip angle θ and squealing sound, the slip angle θ being classified into the three stages as described above, sound waveform data is used so as to obtain a tone that is shifted smoothly by means of so-called cross-fading in which a part of each waveform is overlapped and the volume of one of the waveforms is gradually raised while the volume of other waveform is gradually lowered (see FIG. 6). The sound waveform data is stored in a waveform storage 118 of the game device basic controller 10 (see FIG. 7).

Furthermore, an example of how to configure a data table using such sound waveform data is as follows. Specifically, the sound waveform data is set as a data table in which the waveform #1 through the waveform #3 are cross-faded so that the tone of a squealing sound is smoothly shifted as the slip angle θ changes (see FIG. 6). By using such sound waveform data, tone data can be changed (combining ratio can be changed) in accordance with fluctuation of a control value (slip angle θ in the case of the present embodiment), and the tone can be artificially changed in accordance with the fluctuation of the control value, whereby realistic squealing sounds can be generated.

When setting such data table, it is preferred that the tone of the waveform #1 through the tone of the waveform #3 be set constant. Specifically, by setting a tone line as a default in advance (the broken line shown in FIG. 6, in the case of the present embodiment), the tone of the waveform #1 through the tone of the waveform #3 can be synchronized with one another. It should be noted that the present embodiment describes an example in which the three waveforms are cross-faded, but the present embodiment is not limited to this example, thus the number of waveforms can be increased or reduced according to need.

Figure 7:
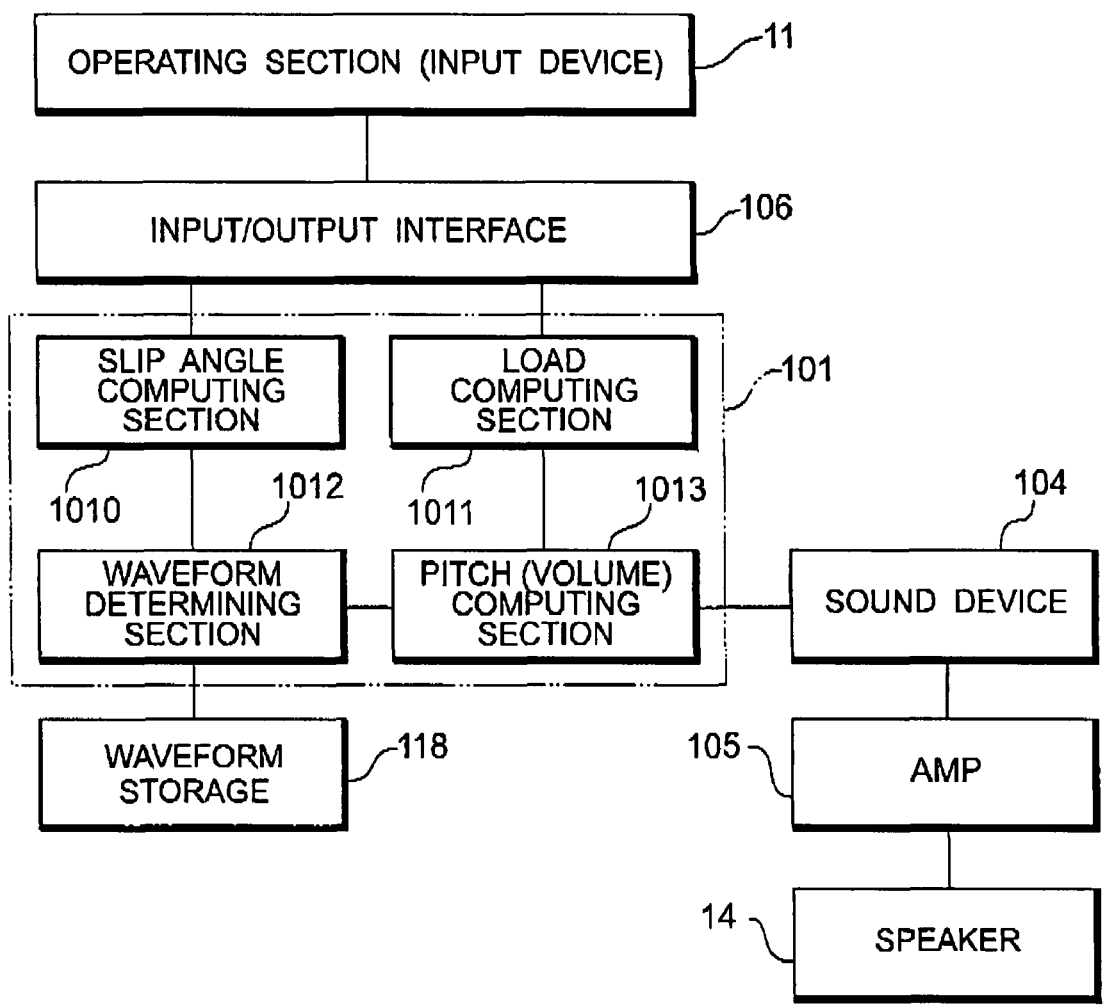
FIG. 7 is a block diagram showing a configuration example for generating and outputting a squealing sound.

Next, a configuration example for generating and outputting a squealing sound in the driving game device 1 is shown (see FIG. 7). As shown in the figure, the CPU 101 of the game device 1 of the present embodiment is configured to perform predetermined processing and output squealing sound data in various computing sections or determining sections of a slip angle computing section 1010, a load computing section 1011, a waveform determining section 1012, and a pitch (volume) computing section 1013.

The slip angle computing section 1010 computes a slip angle θ. As described above, the CPU 101 according to the present embodiment reads in, on the basis of the program installed in the ROM 102, operation signals from the input device 11 and landform data from the landform data ROM 109 or shape data from the shape data ROM 111, calculates various behaviors of the virtual vehicle 4 (simulates movement of the vehicle), outputs command signals, and thereby controls movement of the vehicle. The slip angle computing section 1010 of the present embodiment calculates a slip angle θ on the basis of the results of this movement control. For example, the slip angle computing section 1010 calculates a steering angle on the basis of the amount of rotation of the handle (steering wheel) of the input device 11, calculates the direction of rotation of the tires 5 in view of the results of movement control, computes the traveling direction of the virtual vehicle 4 at the point of time when the steering angle is obtained, and thereby calculates a slip angle α from the difference between the tire rotation direction and the vehicle traveling direction (see FIG. 5).

The load computing section 1011 computes and outputs a load applied to each tire 5 on the basis of the results of the abovementioned movement control. To cite a specific example, given the vehicle information related to the weight and shape of the vehicle and the drive system, the position of the vehicle and forces such as centrifugal force and braking force acting on the vehicle are calculated to compute the load applied to each tire 5, on the basis of the degree of operation of the handle (steering wheel), the accelerator (accelerator pedal) and the brake (brake pedal) of the operating section (input device) 11, as well as on the basis of the shift position of the shift lever, driving situations of the virtual vehicle 4 at the point of time (speed, road (curve or inclination), shape of the road surface, conditions of the road surface, etc.).

The waveform determining section 1012 determines a sound waveform of a squealing sound on the basis of the results of computation of the slip angle θ that is performed by the slip angle computing section 1010. More specifically, the slip angle θ that is obtained by computation is taken as a control value, and a sound waveform corresponding to this control value is determined from the sound waveform data stored in the waveform storage 118 (see FIG. 6). It should be noted that the waveform storage 118 described above stores the sound waveform data, and can be realized by, for example, the ROM 102 and the like of the game device basic controller 10.

The pitch (volume) computing section 1013 computes pitch and volume of a squealing sound on the basis of the sound waveform determined by the waveform determining section 1012 and the load data on each tire 5 that is computed by the load computing section 1011. The computation of pitch and volume in this case is based on that the volume increases and the pitch decreases as the load increases (see Table 1). The pitch (volume) computing section 1013 computes the pitch and volume of each of, for example, four tires 5. By computing the pitch and volume in this manner, the data on the squealing sound is outputted from the pitch (volume computing section 1013 to the sound device 104. The sound device 104 generates sound signals based on this data, and the sound signals are amplified by the power amplifier (AMP) 105, transmitted to the speaker 14, and outputted as a squealing sound in the game device 1 (see FIG. 7). It should be noted that in the case in which independent squealing sound is generated with respect to each of the four tires 5, independent sound can be outputted from the speaker 14 of other channel in the game device 1, whereby realistic and improved sound effects can be obtained.

Figure 8:
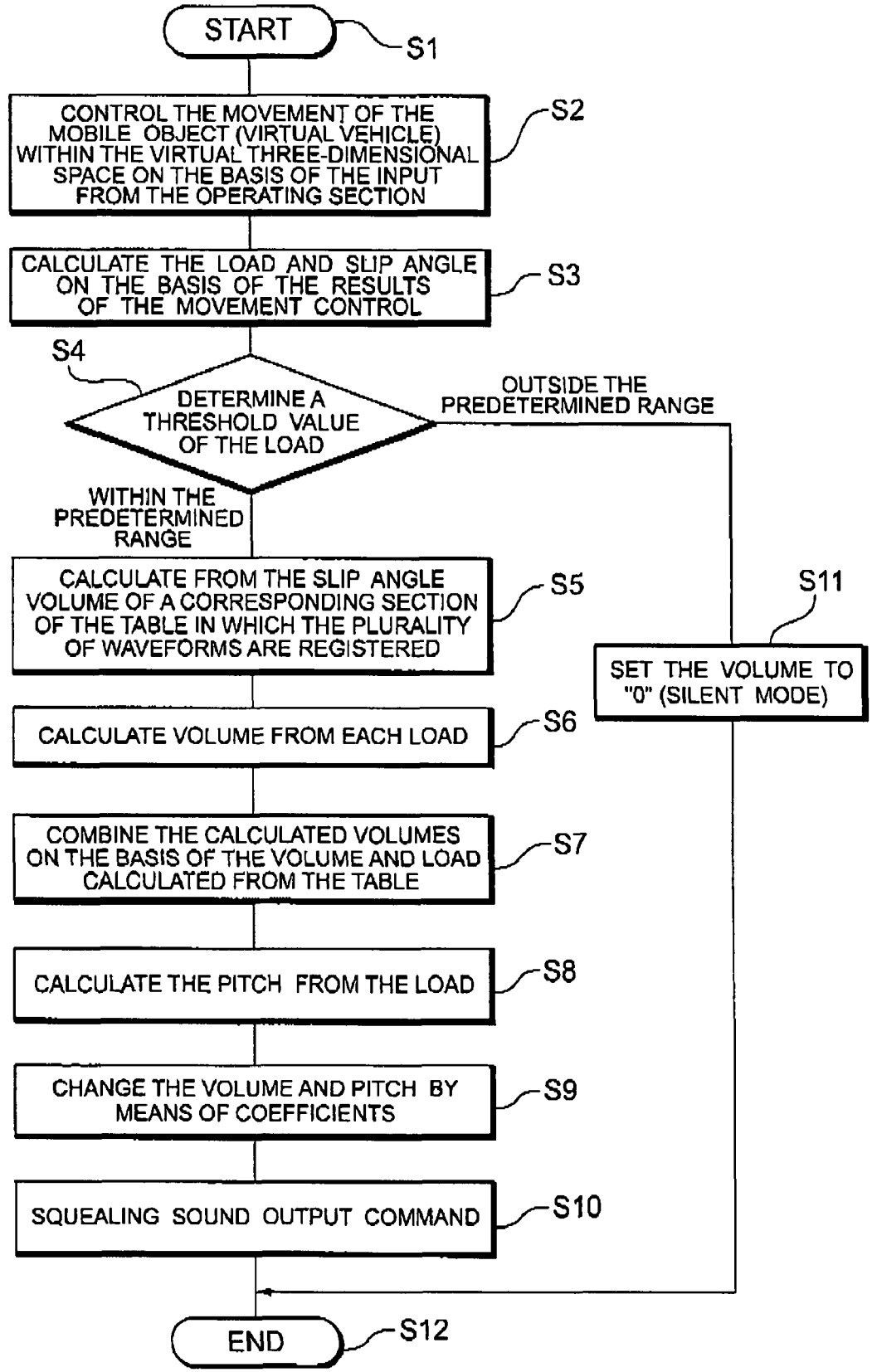
FIG. 8 is a flowchart for explaining an example of a process for generating a squealing sound.

Next, an example of a process for generating a squealing sound in the abovementioned configuration is described (see FIG. 8). The following processing can be performed by causing the computer C to execute a predetermined processing program (squealing sound generation program). Such program can be, of course, saved on an information recording medium such as a floppy® disk, MD, magnetic optical disk, ROM, CD-ROM or the like.

First, after the processing for generating a squealing sound is started (step 1), movement control is performed on the mobile object (virtual vehicle) 4 (step 2). In this step, movement of the mobile object (virtual vehicle) 4 within a three-dimensional space is controlled on the basis of an input from the operating section (input device) 11.

Next, a load applied on each tire 5 and a slip angle θ of each tire 5 are calculated on the basis of the results of the movement control (step 3). In this step, the abovementioned slip angle computing section 1010 calculates the slip angle θ of each tire 4, and the load calculating section 1011 calculates the load applied on each tire 5.

Next, a threshold value of the load is determined in the present embodiment (step 4). Here, determination is made as to whether the load is within a predetermined range. If the load is within the range, the processing of step 5 is performed, and if the load is not within the predetermined range, the volume is set to 0, i.e., a silent mode (step 11). For example, if the load is small or excessively small, the volume of the squealing sound is low or excessively low, thus omitting outputs does not cause any influences. In the present embodiment, a threshold value of the load is determined in this stage, and, if generation/output of squealing sounds can be omitted, subsequent processing is not carried out (see FIG. 8). In such a case, the processing load on the computer C can be reduced accordingly.

In step 5, volumes of relevant parts in the data table in which a plurality of waveforms are registered are calculated from the calculated slip angles θ. Specifically, the slip angles θ obtained by computation are substituted for the control values shown in the horizontal axis, and the volumes corresponding to the control values are calculated. For example, in the case in which the control value (slip angle θ) is a value shown in the area where the waveform #1 intersects with the waveform #2, a squealing sound with volume and tone obtained by adding the volume component of the waveform #1 corresponding to this value to the volume component of the waveform #2 corresponding to this value is obtained (see FIG. 6). It should be noted that a minimum value and a maximum value of the slip angle θ, which is the control value, are set to 0 and 3π/2 respectively in the present embodiment, but this maximum value can be changed appropriate in accordance with, for example, the number of waveforms.

Also, an example of volume combining ratio is as follows. Specifically, after substituting the slip angle θ for the control value (a), the volume of each of the waveforms #1 through #3 is calculated from each of the equations shown hereinbelow, and these volumes are combined to obtain the volume of a squealing sound. For example, when a is 0 (minimum value), sin (a) is also 0, thus v1=0. Also, when a is 3π/2 (maximum value), the size of v3 is 1.

$$v1 = \sin(a)(v1 \geq 0) \quad [\text{Equation 1}]$$

$$v2 = \sin(a - \pi/2)(v2 \geq 0) \quad [\text{Equation 2}]$$

$$v3 \sin(a - \pi)(v3 \geq 0) \quad [\text{Equation 3}]$$

Next, the volume of the squealing sound is calculated from the calculated load (step 6). For example, in the present embodiment, the pitch (volume) computing section 1013 computes and calculates the volume of the squealing sound on the basis of the sound waveform determined by the waveform determining section 1012 and the data of the load of each tire 5 that is computed by the load computing section 1011.

Thereafter, the volume that is calculated from the abovementioned data table and the volume that is calculated from the load are combined (step 7).

Furthermore, the pitch of the squealing sound is calculated from the load (step 8). As described above, on the basis of the relation in which the pitch decreases as the load increases (see Table 1), the pitch corresponding to the load is calculated (see FIG. 6).

Moreover, in the present embodiment, the volume and pitch that are calculated in the manner described above are changed by coefficients (step 9). This means that the coefficients of vehicle types that are set beforehand are multiplied, wherein, for example, various vehicle information related to the weight and shape of the vehicles and the drive systems can be reflected by means of relatively simple processing of multiplying the coefficients. The coefficients are set for the vehicle types beforehand on the basis of the vehicle information. Although this step can be omitted, the generation processing of the present embodiment that multiplies the coefficients to reflect the vehicle information in this manner can generate squealing sounds that are adjusted in detail in accordance with the characteristics of the vehicle types.

Once the volume and pitch are determined in the above procedures, a command to output the squealing sound is issued (step 10). For example, in the case of the game device 1 of the present embodiment, the abovementioned pitch (volume) computing section 1013 outputs the data of the squealing sound to the sound device 104, whereby sound signals are generated and amplified by the power amplifier (AMP) 105, and then transmitted to the speaker 14, and the squealing sound is outputted. It should be noted that the squealing sound output command issued in the step 10 is a command to start playing back a sound waveform that is repeatedly played back as with an endless tape, thus it is sufficient to issue the first squealing sound output command, and subsequent output may be omitted.

Thereafter, the series of the squealing sound generation processing is ended (step 12). Although FIG. 8 shows the steps from the beginning to the end of the squealing sound generation processing, actually a loop such as a loop between, for example, the beginning and the end of a game is processed, and the squealing sound generation/output processing is performed successively.

As described above, in the game device 1 of the present embodiment, the unique squealing sound generation technique makes it possible to generate and output squealing sounds having a variety of changes in tones and improved rationality as the sound information. Specifically, there are a variety of different changes in squealing sounds in an actual vehicle, and, by focusing on the slip angle θ of each tire 5 and the load applied on each tire 5, which are the factors closely related to the variety of changes in tones, realistic squealing sounds can be generated.

Furthermore, in the present embodiment, the computer C is caused to execute the function of generating independent squealing sound for each of the plurality of tires 5, thus the player can be provided with more detailed vehicle body behavior information. Specifically, while driving, different loads act on the tires respectively under circumstances that change successively, and the slip angles θ of the respective tires also change. Therefore, instead of generating/outputting a squealing sound of, for example, four tires 5 integrally, it the squealing sound of one tire is controlled, generated, and outputted individually in view of such circumstances, hereby more detailed vehicle body behavior information can be obtained. Such game device 1 of the present embodiment enables a game to proceed smoothly by allowing the player to have a better understanding about behavior and running conditions of the operated (maneuvered) virtual vehicle 4, and can further create a variety of tones so that the player can enjoy more powerful sound effects.

Although the above embodiment is an example of the preferred embodiments of the present invention, but the present invention is not limited to this embodiment and thus can be modified variously without departing from the scope of the present invention. For example, the present invention illustrates a four-wheel vehicle (such as a converted stock-car circuit machine, a rally car, etc.) as the mobile object 4, which is the virtual vehicle, but the present invention can be applied to not only such various types of four-wheel vehicles, but also a two-wheel vehicle, or other mobile object having a plurality of tires 5.

Also, the above-described embodiments specifically describes a case in which squealing sounds of the virtual vehicle 4 operated by the player are generated/outputted, but the present invention can also be applied to, for example, an opponent vehicle (enemy vehicle) in a race-type game in which the virtual vehicle competes with the opponent vehicle. In this case, the same squealing sound processing as the one described above can be performed on the opponent vehicle operated by other player. Also, on an opponent vehicle controlled by the CPU 101 (a virtual vehicle that is created by the CPU 101 when one player plays a game alone), operation and input performed by the player are not considered in principle, thus squealing sounds can be generated on the basis of the driving situations of the opponent vehicle based on the program. In other words, squealing sounds are sometimes generated/outputted on the basis of an image in which the mobile object 4 of other player is set as the base (e.g., an image of the mobile object of other player as seen from behind). There is also a case in which squealing sounds are generated/outputted on the bases an image which is used at the time of replay or in which a mobile object of other player/CPU is set as the base (an image that is used at the time of replay or when displaying the situations on the monitor). It should be noted that the display device 13 shown in FIG. 1 displays the virtual vehicle 4 as an opponent vehicle (see FIG. 1).

Moreover, the embodiment described above illustrates the data table in which the data on the three sound waveforms are cross-faded, but this example is also merely an example. For example, the waveforms shown in FIG. 6 are each in the form of a trapezoid, but the sound waveform data can also be in the form of a sine curve or the like, thus the shape of each waveform can be changed appropriately. Moreover, the data table may be changed or determined in accordance with the types or characteristics of the mobile object (virtual vehicle) 4. For example, a plurality of types of the virtual vehicle 4 corresponding to actual vehicles can be prepared, and the characteristics of each vehicle type can be reflected in more detail in the case of the game device 1 on which players can select vehicle types according to taste, whereby the players can experience a realistic game. To cite an example, the volume, pitch, and tone of a squealing sound may be changed or determined in view of the vehicle type, structure, price and the like of the vehicle, on the basis of an even in which squealing sounds are hardly generated in a vehicle having a mechanically unstable leg room, compared to a vehicle having a mechanically stable leg room. By changing the sound in accordance with the vehicle type, the sound coming from the inside or outside of the vehicle, characterization of each vehicle type can be improved.

Moreover, the computer may be caused to execute a step of switching between the processing for generating a squealing sound and avoidance of the processing for generating a squealing sound, in response to a change in a viewpoint of an image in the game device 1, or a change in the distance between the mobile object operated by a player and a mobile object, which is a target for generating a squealing sound. In the case in which the viewpoint of the image of the driver's view is switched to a viewpoint in which the image is seen from a distance, or in the case in which the target mobile object (e.g., an opponent vehicle) moves far away from a virtual current position of the player, it means it is determined that the squealing sound no longer needs to be generated. Therefore, in such a case, the processing for generating a squealing sound can be avoided and omitted, whereby calculation of the load can be simplified. Also, the present embodiment is preferable in that the game can be made more realistic by appropriately lowering the volume of the squealing sound of the opponent vehicle in accordance with the distance.

Furthermore, the above-described embodiment describes the usual generation processing technique for generating squealing sounds on the basis of the load and slip angle θ (first generation processing technique), but this processing technique may be switched to either a simple generation processing (second generation processing technique) for generating squealing sounds on the basis of a load only in accordance with circumstances, or avoidance of the squealing sound generation processing. In the case in which the viewpoint of the image in the game device 1 is changed, or in the case in which the distance between the virtual vehicle 4 operated by the player and the mobile object (opponent vehicle, for example), which is the target for generating squealing sounds, increases, the generation processing contents can be switched on the basis of the virtual distance between the mobile object and the target opponent vehicle. In such a case, appropriate processing can be executed according to the circumstances such that the generation processing can be avoided when squealing sounds do not need to be generated, the squealing sounds are generated simply when the squealing sounds are not important, and the usual processing is performed and information on the load or slip angle θ is added when the squealing sounds are important. Therefore, the computation amount in the computer C can be kept within a necessary range. Accordingly, squealing sounds that are similar to real squealing sounds can be generated in spite of the small computation amount.

In addition, in the case in which the engine speed of the virtual vehicle 4 is calculated to output the engine sound, the virtual vehicle 4 being the squealing sound generation target, the volume of the engine sound may be lowered temporarily when the squealing sounds are generated. The squealing sounds are an extremely important information source in order to understand the behavior of the vehicle body, thus, when outputting the squealing sound in the game device 1, it is preferred that the volume of the engine sound of the virtual vehicle 4 be lowered temporarily so that squealing sounds that the player can hear more comfortably can be generated. Incidentally, when the volume of the engine sound is temporarily lowered as described above, the volume of the engine is raised (returned) relatively upon completion of output of the squealing sounds, thus an effect is obtained in which the engine sound that tends to become loud sounds enhanced to a certain degree, on the leading edge of a corner, for example.

The present embodiment describes a case in which the present invention is applied to the game device 1 for simulation gaming on which a player can pretend to be a driver of the virtual mobile object (virtual vehicle) 4 within a virtual three-dimensional space and enjoy a car race, Time Attack, or other driving game, but the game device 1 in this case is merely an example preferred as the information processing device to which the present invention can be applied. Examples of the information processing device include an arcade game device, a home-use game device, a portable game device, a cellular phone, a personal computer, and the like. In other words, the present invention can be applied to a simulator, a play-only device that is not interactive, or other devices.

We claim:

1. A computer program product comprising:
    a computer usable medium having a computer readable program code embodied therein,
    wherein the program product is a program for causing a computer of an information processing device to execute processing for generating a sound that is generated by a mobile object with a plurality of tires, which moves on a predetermined surface within a virtual three-dimensional space, the computer program comprising:
    a computer readable code configured to cause the computer to control movement of the mobile object;
    a computer readable code configured to cause the computer to calculate a load applied to at least one of the tires of the mobile object;
    a computer readable code configured to cause the computer to control, on the basis of the load, a volume and a pitch of a squealing sound generated from at least one of the tires;
    a computer readable code configured to cause the computer to output the squealing sound;
    a computer readable code configured to cause the computer to calculate a slip angle of at least one of the tires of the mobile object; and
    a computer readable code configured to cause the computer to change a tone of the squealing sound on the basis of the slip angle.

2. The computer program product according to claim 1, further causing the computer to execute a step of determining whether to generate the squealing sound, only when the load is within a predetermined range.

3. The computer program product according to claim 2, further causing the computer to execute a step of switching between the processing for generating the squealing sound and avoidance of the processing for generating the squealing sound, in response to a change in a viewpoint of an image in the information processing device, or a change in the distance between a mobile object, which is the basis of the viewpoint, and the mobile object, which is a target for generating the squealing sound.

4. The computer program product according to claim 2, further causing the computer to execute a step of switching to first generation processing for generating the squealing sound on the basis of the load and the slip angle, second generation processing for generating the squealing sound on the basis of the load only, or avoidance of the squealing sound generation processing, in response to a change in a viewpoint of an image in the information processing device, or a change in the distance between a mobile object, which is the basis of the viewpoint, and the mobile object, which is a target for generating the squealing sound.

5. The computer program product according to claim 2, causing the computer to realize a function of generating independent squealing sound for each of the plurality of tires.

6. The computer program product according to claim 2, further causing the computer to execute steps of:
    calculating an engine speed of the mobile object;
    generating an engine sound on the basis of the engine speed; and
    lowering the volume of the engine sound when the squealing sound is generated.

7. The computer program product according to claim 1, further causing the computer to execute a step of switching between the processing for generating the squealing sound and avoidance of the processing for generating the squealing sound, in response to a change in a viewpoint of an image in the information processing device, or a change in the distance between a mobile object, which is the basis of the viewpoint, and the mobile object, which is a target for generating the squealing sound.

8. The computer program product according to claim 1, further causing the computer to execute a step of switching to first generation processing for generating the squealing sound on the basis of the load and the slip angle, second generation processing for generating the squealing sound on the basis of the load only, or avoidance of the squealing sound generation processing, in response to a change in a viewpoint of an image in the information processing device, or a change in the distance between a mobile object, which is the basis of the viewpoint, and the mobile object, which is a target for generating the squealing sound.

9. The computer program product according to claim 1, causing the computer to realize a function of generating independent squealing sound for each of the plurality of tires.

10. The computer program product according to claim 1, further causing the computer to execute steps of:
    calculating an engine speed of the mobile object;
    generating an engine sound on the basis of the engine speed; and
    lowering the volume of the engine sound when the squealing sound is generated.

11. A computer program product comprising:
    a computer usable medium having a computer readable program code embodied therein,
    wherein the program product is a program for causing a computer of an information processing device to execute processing for generating a sound that is generated by a mobile object with a plurality of tires, which moves on a predetermined surface within a virtual three-dimensional space, the computer program comprising:
    a computer readable code configured to cause the computer to control movement of the mobile object;
    a computer readable code configured to cause the computer to calculate a load applied to at least one of the tires of the mobile object;
    a computer readable code configured to cause the computer to control, on the basis of the load, a volume and a pitch of a squealing sound generated from at least one of the tires; and
    a computer readable code configured to cause the computer to output the squealing sound,
    wherein the computer program product further causes the computer to execute a step of determining whether to generate the squealing sound, only when the load is within a predetermined range.

12. An information processing device, which causes a computer to execute processing for generating a sound that is generated by a mobile object with a plurality of tires, which moves on a predetermined surface within a virtual three-dimensional space, and to output the generated sound, the information processing device comprising:
 a computer that calculates a load applied to at least one of the tires of the mobile object subjected to movement control; controls, on the basis of the calculated load, a volume and a pitch of a squealing sound generated from at least one of the tires; calculates a slip angle of at least one of the tires of the mobile object; and changes a tone of the squealing sound on the basis of the slip angle; and
 an output device that outputs the squealing sound.

13. A squealing sound generation method for performing processing for generating a sound that is generated by a mobile object with a plurality of tires, which moves on a predetermined surface within a virtual three-dimensional space in an information processing device, the method having steps of:
 controlling movement of the mobile object;
 calculating a load that is applied to at least one of the tires of the mobile object at the time when the movement of the mobile object is controlled;
 controlling, on the basis of the calculated load, a volume and a pitch of a squealing sound generated from at least one of the tires;
 calculating a slip angle of at least one of the tires of the mobile object;
 changing a tone of the squealing sound on the basis of the slip angle; and outputting the squealing sound.

* * * * *